(12) United States Patent
Simske

(10) Patent No.: US 9,195,837 B2
(45) Date of Patent: Nov. 24, 2015

(54) METHOD AND SYSTEM FOR SECURELY TRANSMITTING DETERRENT DATA

(75) Inventor: Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2428 days.

(21) Appl. No.: 11/948,632

(22) Filed: Nov. 30, 2007

(65) Prior Publication Data

US 2009/0144799 A1    Jun. 4, 2009

(51) Int. Cl.
*H04L 29/06*    (2006.01)
*G06F 21/60*    (2013.01)

(52) U.S. Cl.
CPC .................... *G06F 21/606* (2013.01)

(58) Field of Classification Search
CPC .............................. G06F 21/606; H04N 1/405
USPC .......... 380/28–30, 37, 59; 382/100, 128, 229; 358/3.28
See application file for complete search history.

(56) References Cited

U.S. PATENT DOCUMENTS

| | | | |
|---|---|---|---|
| 3,634,821 A | 1/1972 | Bossen et al. | |
| 5,526,477 A * | 6/1996 | McConnell et al. | 345/467 |
| 5,623,549 A | 4/1997 | Ritter | |
| 5,838,794 A | 11/1998 | Mittenthal | |
| 6,731,754 B1 | 5/2004 | Ito | |
| 2003/0026346 A1 | 2/2003 | Matsumoto et al. | |
| 2004/0146162 A1 | 7/2004 | Gilbert et al. | |
| 2004/0225773 A1 * | 11/2004 | Wang et al. | 710/200 |
| 2005/0111695 A1 | 5/2005 | Yacobi | |
| 2005/0251724 A1 | 11/2005 | Matsumoto | |
| 2006/0059403 A1 | 3/2006 | Watanabe | |

FOREIGN PATENT DOCUMENTS

| | | |
|---|---|---|
| CN | 1471258 | 1/2004 |
| CN | 1773906 | 5/2006 |
| JP | 2003076273 | 3/2003 |
| JP | 2003223099 | 8/2003 |

* cited by examiner

*Primary Examiner* — Farid Homayounmehr
*Assistant Examiner* — Suman Debnath
(74) *Attorney, Agent, or Firm* — Dierker & Associates, P.C.

(57) ABSTRACT

A method for securely transmitting deterrent data includes generating a deterrent having a predesigned number and configuration of glyphs having deterrent data therein, and transmitting a portion of the deterrent data from a subset of the glyphs without transmitting deterrent data from a remainder of the glyphs. The glyphs form a predetermined structure with a single solution. The method further includes receiving the portion of the deterrent data, placing the portion of the deterrent data into the subset of the glyphs, and solving the predetermined structure with the single solution, thereby determining the remainder of the glyphs to be infilled in the predetermined structure with deterrent data gleaned from the solution.

13 Claims, 3 Drawing Sheets

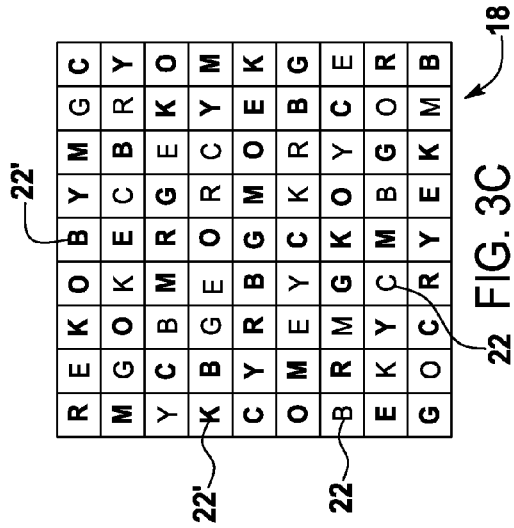
FIG. 3A
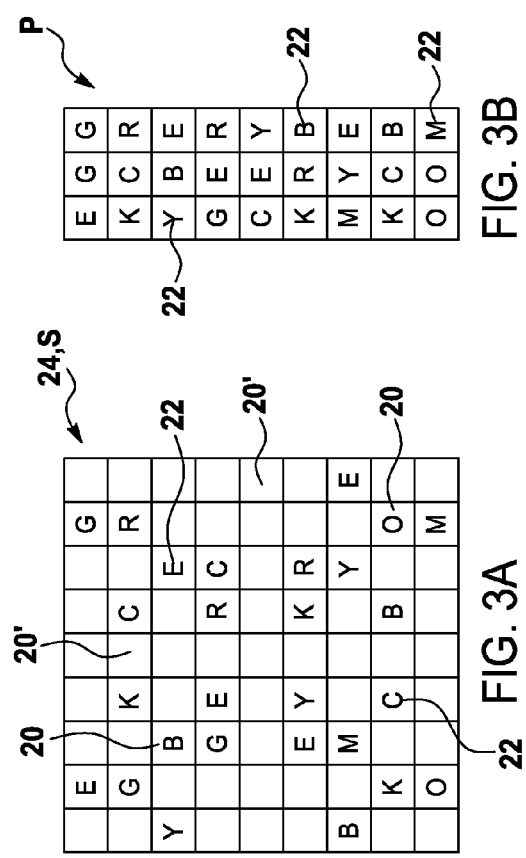
FIG. 3B
FIG. 3C
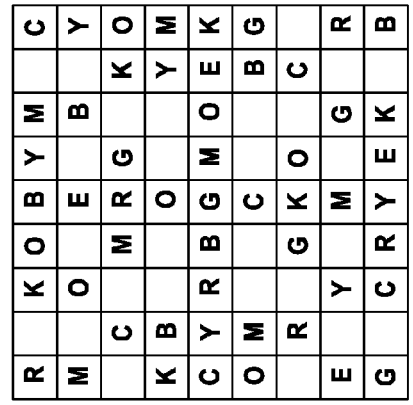
FIG. 3D
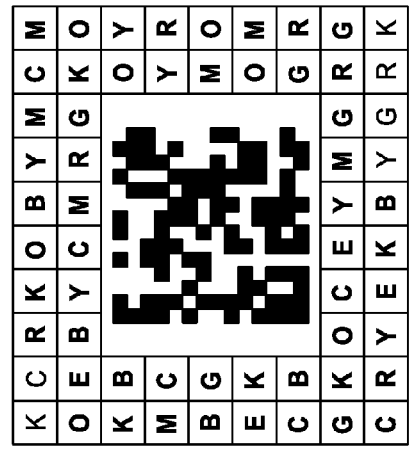
FIG. 3E

METHOD AND SYSTEM FOR SECURELY TRANSMITTING DETERRENT DATA

BACKGROUND

The present disclosure relates generally to methods and systems for securely transmitting deterrent data.

Security printing and publishing is an important component of product differentiation, tracking and authenticating, as well as of anti-counterfeiting initiatives. Security printing involves providing each package with a unique ID, in the form of, for example, a deterrent or mark. Image-based deterrents underpin security printing and imaging programs, using variable data printing (VDP) to provide security simultaneously with product branding and customized printing.

In many security VDP situations, security printing codes are provided to print service providers (PSP). If such codes are provided to print service providers, it may also be desirable to obscure the final encoding, substantially without compromising distribution and sharing mechanisms in place between the various parties involved (e.g., deterrent generator, print service provider, brand owner, etc.).

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

FIGS. 3A through 3E are semi-schematic depictions of A) an embodiment of a pattern including a portion of data from an original deterrent, the pattern being used to glean deterrent data to be infilled in glyphs of a predetermined structure, B) an embodiment of the portion of the data from FIG. 3A transmitted to a print provider, C) a single solution for the predetermined structure, D) the predetermined structure highlighting the gleaned deterrent data, and E) a security deterrent employing the gleaned deterrent data.

DETAILED DESCRIPTION

Embodiments of the method and system disclosed herein advantageously enable a deterrent generator and a print provider to use an unsecured connection for transmitting a portion of deterrent data. The transmitted deterrent data may be used to determine additional (non-transmitted) deterrent data that may be implemented into one or more security deterrents. Without being bound to any theory, it is believed that the use of structured deterrents allows open sharing of a portion of deterrent data, substantially without compromising the overall security. Furthermore, because the final structured deterrent is represented with a fraction of the data, the variable data printing portion may be highly compressed.

Figure 1:
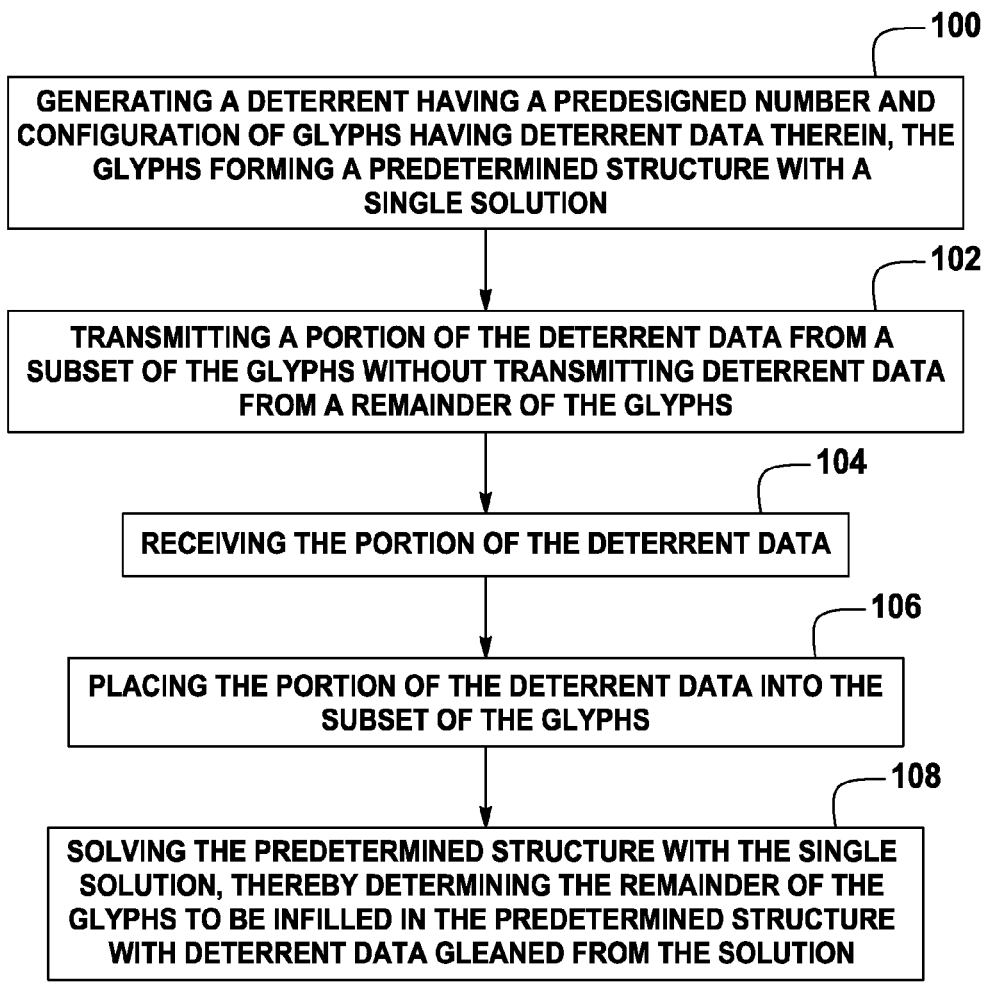
FIG. 1 is a flow diagram depicting an embodiment of a method for securely transmitting deterrent data.

Referring now to FIG. 1, an embodiment of the method for securely transmitting deterrent data is depicted. Generally, the method includes generating a deterrent having a predesigned number and configuration of glyphs having deterrent data therein, the glyphs forming a predetermined structure with a single solution, as shown at reference numeral 100; transmitting a portion of the deterrent data from a subset of the glyphs without transmitting deterrent data from a remainder of the glyphs, as shown at reference numeral 102; receiving the portion of the deterrent data, as shown at reference numeral 104; placing the portion of the deterrent data into the subset of the glyphs, as shown at reference numeral 106; and solving the predetermined structure with the single solution, thereby determining the remainder of the glyphs to be infilled in the predetermined structure with deterrent data gleaned from the solution, as shown at reference numeral 108. It is to be understood that this and other embodiments of the method are discussed further hereinbelow.

Figure 2:
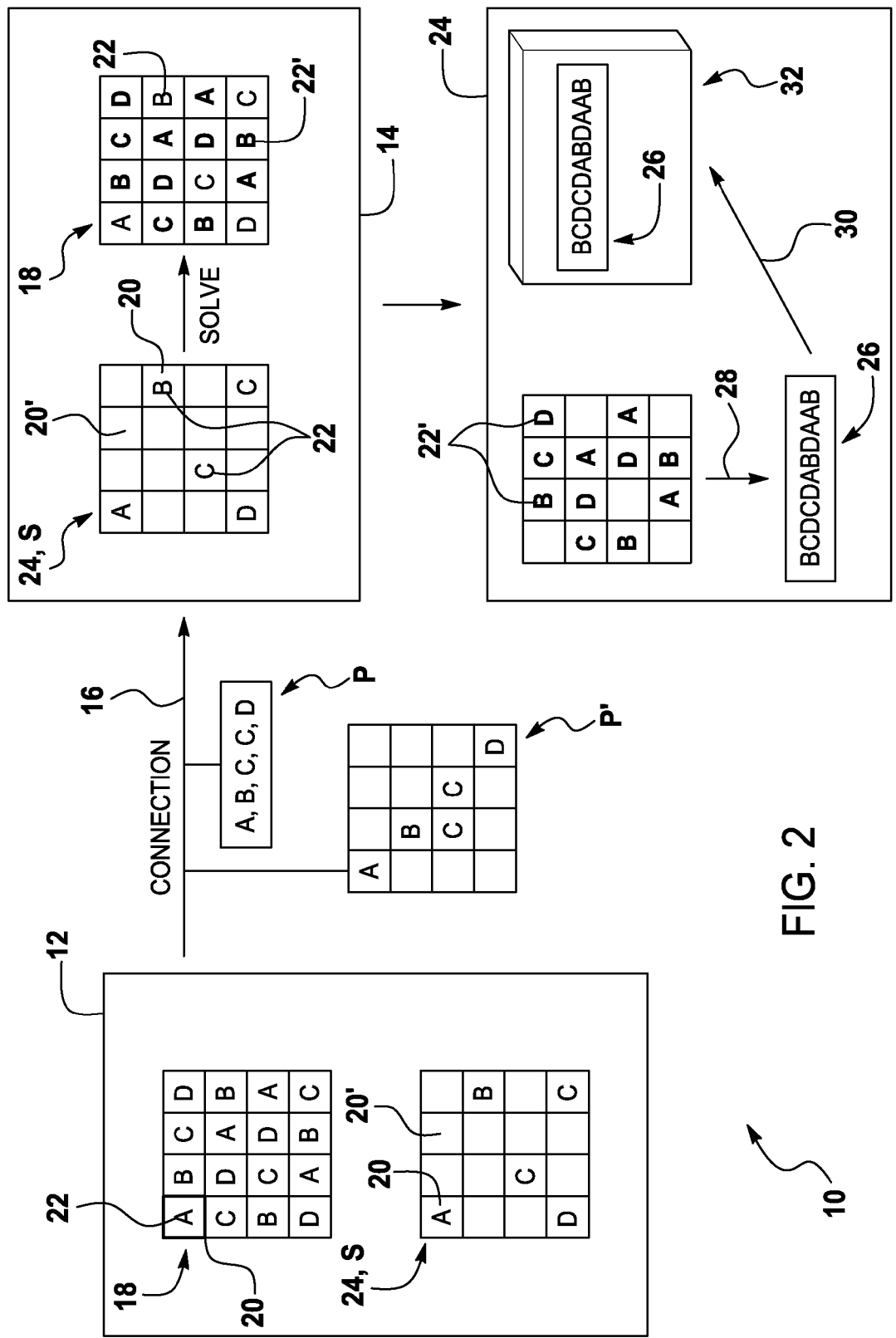
FIG. 2 is a schematic diagram depicting an embodiment of a system for securely transmitting deterrent data.

FIG. 2 depicts an embodiment of the system 10 for securely transmitting deterrent data. Generally, the system 10 includes a deterrent provider 12, a print provider 14, and a connection 16 therebetween. The deterrent provider 12 generates a deterrent 18 having a predesigned number and configuration of glyphs 20 (one of which is bolded to facilitate understanding) having deterrent data 22 therein. As used herein, the term "glyph" refers to any tile, mark or other shape that fits into a structured formation containing multiple glyphs, where together they make up a known set of values.

The glyphs 20 together form a predetermined structure with a single solution. The predetermined structure may be a Sudoku, a latin square, a magic square, or the like. Non-limiting examples of the predetermined structure include Sudoku grids having 5×5 cells (i.e., containing twenty-five glyphs 20 in each row and column, and twenty-five glyphs 20 in each individual cell), 4×4 cells (i.e., containing sixteen glyphs 20 in each row and column, and sixteen glyphs 20 in each individual cell), 3×3 cells (i.e., containing nine glyphs 20 in each row and column, and nine glyphs 20 in each individual cell), 2×3 cells, 3×2 cells, 2×2 cells (shown in FIG. 2), or the like. The listed cell structures are merely illustrative, and the predetermined structure may include N×M cells, where N and M are positive integers (not necessarily equal) to provide any number of desired deterrent data 22 or to match a desirable size.

The deterrent data 22 contained in each glyph 20 may be selected from colors, numbers, letters, graphics, symbols, bytes, characters, interpretable information, fingerprints, other biometric data (e.g., encoded, encrypted, scrambled, chained to other information), modulation transfer functions (MTF) (e.g., used in conjunction with a target pattern), or any other pattern in which individual elements of the set are distinguishable, or combinations thereof. Generally, any suitable deterrent data 22 may be used, as long as the desirable single solution is obtained when the data 22 is integrated into the glyphs 20 of the predetermined structure. As such, there are a large number of deterrent data 22 that may be used to encode a desirable single solution, depending solely on where the deterrent data 22 are interpreted to belong.

It is to be understood that the deterrent provider 12 may select the predetermined structure of the glyphs 20 and the deterrent data 22. Generally, each predetermined structure has a specific number of solutions. As a non-limiting example, a 3×3 cell predetermined structure having nine glyphs 20 in each row and column contains the numerals 1, 2, 3, 4, 5, 6, 7, 8 and 9 as deterrent data 22. The specific number of solutions for this grid and deterrent data combination is about $6.67 \times 10^{21}$.

Further, it is to be understood that the deterrent data 22 is selected such that it fits into a specific/particular solution for the predetermined structure. The deterrent provider 12 determines which single solution is desirable for the particular deterrent 18 composed of the predetermined structure/set of structures. For example, as shown in FIG. 2, a 2×2 cell grid is the predetermined structure, and letters A, B, C and D are used as the deterrent data 22. In this example, each letter is implemented into the grid such that it appears once in each cell, row and column. The non-limiting example shown in FIG. 2 is the particular solution for this particular grid with the set of specified values provided, and the order of the deterrent data 22 fits the single solution selected by the deterrent provider 12. It is to be understood that there is one, unambiguous solution to a structure or combination of structures once the deterrent data 22 are put in place.

In addition to the deterrent 18, the deterrent provider 12 also generates a pattern 24 which may be used to determine the single solution. This pattern 24 represents a subset S of the glyphs 20 of the original deterrent 18, and includes glyphs 20' not having deterrent data 22 therein. The pattern 24/subset S enables the receiving end (e.g., the print provider 14) to determine the deterrent data 22 to be infilled in the glyphs 20' using a completion algorithm. It is to be understood that solving the predetermined structure is a relatively straightforward rule-based machine task, as long as deterrent data 22 provided in the pattern 24/subset S specify a single, unambiguous solution. The pattern 24/subset S is generally known by both the deterrent provider 12 and the print provider 14. As such, the pattern 24/subset S is shared using secure means.

The pattern 24/subset S may be refreshed one time, several times, or in a logical succession. One advantage of this approach over a one-time pad is that the structure implicitly provides for a larger set of data D than the pattern 24/subset S itself, and so re-use of the structure is possible for N>1 times without compromising the pad. "N" depends on the nature of the structure and the difficulty of the specified pattern 24/subset S (i.e., the most challenging pattern 24/subset S specifies about ¼ of the deterrent data 22, so D=3S). Latin squares and Sudokus do not have closed form solutions, and it is believed that this may provide additional protection in preventing cracking of the code of transmission, thereby affording N-time pads in place of 1-time pads.

In some instances, when less secure means are available to share the pattern 24/subset S, it may be desirable to tie the pattern 24/subset S to a printing device (e.g. in the printer's security chip, or Trusted Platform Module).

When both entities 12, 14 are privy to the pattern 24/subset S, the deterrent generator 12 may transmit, to the print provider 14 via the connection 16, the deterrent data 22 from the pattern 24/subset S (which represents a portion of data 22 from all of the glyphs 20 in the original deterrent 18) in a format other than that of the pattern 24/subset S. As such, the transmitted deterrent data 22 is selected from some, but not all of the glyphs 20 in the original deterrent 18. Generally, the amount of deterrent data 22 transmitted depends, at least in part, on the size of the predetermined structure. For example, enough data 22 should be transmitted such that the desirable recipient (i.e., the receiving end that is privy to the pattern 24/subset S) is able to solve the predetermined structure. It may also be undesirable to send too much data 22, as this may, in some instances, make it easier for an undesirable interceptor (of the transmitted data 22) to solve the predetermined structure. In an embodiment, the amount of data 22 transmitted ranges from about 25% to about 50% of the data 22 included in the original deterrent 18. As a non-limiting example, a 3×3 cell includes eighty-one glyphs 20 having deterrent data 22 therein, and deterrent data 22 from twenty-one to forty of the glyphs 20 may be transmitted via the connection 16. Generally, this approach provides a good trade off between specifying enough deterrent data 22 to facilitate a fast solution (e.g., somewhere from about 30 to about 40 of 81 glyphs) and leaving the rest (approximately 40 to 50 glyphs, each glyph having 1 of 9 possible marks, thus >3 bits/glyph) unspecified to use as deterrent data 22 in a security deterrent member 26 (discussed further hereinbelow).

It is to be understood that the pattern 24/subset S itself is not transmitted via the connection 16, rather the portion P, P' of deterrent data 22 from the pattern 24/subset S is transmitted. It is to be further understood that the transmitted portion P, P' is not indicative of the location of the data 22 within the pattern 24/subset S. Rather, the portion P, P' may be transmitted in an unformatted manner, or in a formatted manner, such as, for example, as a list (shown as P), an unsolvable structure (shown as P'), or any other like format that does not teach or suggest the position or location of the transmitted deterrent data 22 in the pattern 24/subset S and deterrent 18. Since the transmitted portion P, P' includes what appears to be general or unsolvable information, this transmission may take place on a secured or unsecured connection 16. This is due, at least in part, to the fact that if a would-be counterfeiter intercepted the transmission, he/she would be unable to easily, if at all, solve the predetermined structure of the deterrent 18.

The print provider 14 receives the portion P, P' of deterrent data 22 via the connection 16. Since the print provider 14 is privy to the pattern 24/subset S, the print provider 14 may input the received portion P, P' of deterrent data 22 into the predetermined structure according to the pattern 24/subset S, and solve the single solution using a completion algorithm. By solving the single solution, the print provider 14 determines (e.g., algorithmically) the deterrent data 22' (bolded to facilitate understanding) to be infilled in the glyphs 20' of the pattern 24/subset S, thereby rendering the deterrent 18. As such, the deterrent data 22' to be infilled is gleaned from the solved single solution. It is to be understood that even for extremely challenging deterrents 18, simple machine algorithms can reduce to a small number the number of speculative infills that should be explored before a complete solution (and thus deterrent data 22') is gleaned.

The print provider 14 may then utilize a system 24 to operatively deploy the gleaned deterrent data 22' into a security deterrent member 26. Generally, the system 24 is a part of the print provider 14, and includes a program 28 for generating the security deterrent member 26 having the gleaned deterrent data 22' therein, and a printer 30 for establishing the security deterrent member 26 on an object 32.

As shown schematically in FIG. 2, the program 28 retrieves the gleaned deterrent data 22' from the solved deterrent 18 and generates the security deterrent member 26 having that data 22' therein. It is to be understood that the program 28 may be any suitable computer program for the generation of such deterrent members 26. The security deterrent member 26 is selected from color bars, color tiles, guilloche patterns, concentric black/white rectangle patterns, 2-dimensional barcodes, modulation transfer function (MTF) patterns, tile patterns, color lines, fingerprint patterns, color text, copy detection patterns (CDP), letter sequences, number sequences, graphic sequences, target patterns, watermarks, or any other set of elements that can be mutually distinguished unambiguously, or combinations thereof. The security deterrent member 26 selected may depend, at least in part, on the type of deterrent data 22' to be included therein. For a non-limiting example, and as shown in FIG. 2, if the gleaned deterrent data 22' includes a plurality of letters, the security deterrent member 26 may be, for example, a letter sequence.

The printer 30 is then used to print the security deterrent member 26 at any desirable position on the object 32. It is to be understood that the term "object" as used herein is to be interpreted broadly and may include, but is not limited to any type of object, product, document or package. Likewise, the term "package" is to be interpreted broadly herein to include any unit for containing a product, displaying a product, or otherwise identifying a branded good. Non-limitative examples of such packages include boxes, bags, containers, clamshells, bands, tape, wraps, ties, bottles, vials, dispensers, inserts, other documents, or the like, or combinations thereof.

The object 32 containing the printed security deterrent member 26 may be authenticated at any point after the object 32 is received. As non-limiting examples, a retailer, a consumer, or an inspector may initiate authentication. In order to authenticate the object 32 in one embodiment, the entity initiating authentication is given the pattern 24/subset S, such that the predetermined structure may be solved using the pattern 24/subset S and the gleaned data 22' retrieved from the security deterrent member 26. In another embodiment, there may be a direct, secure path that accesses the list of legitimate security deterrent members 26.

As such, verification of the object 32 is generally performed using a different set of data 22' than the data 22 transmitted to the print provider 14. It is believed that this advantageously renders data translation between the two sets of data 22, 22' more difficult. For example, 40% of the data 22 may be sent to the print provider 14, and a completely different 40% of the data 22' may be implemented into the security deterrent member 26 and read during inspection/authentication. Both sets of data 22, 22' completely specify the original deterrent 18, but are not correlated to each other without knowledge of the pattern 24/subset S. As such, packet snooping and other forms of transmission monitoring become less useful to the would-be counterfeiter when embodiments of the method and system 10 disclosed herein are used to transmit deterrent data 22.

FIGS. 3A through 3E together illustrate an example of the embodiments disclosed herein. Generally, the color tile deterrent 18 (shown in FIG. 3C after having been solved) in this non-limiting example is a 3×3 cell grid (i.e., having nine glyphs 20 in each column and row). The deterrent data 22 of the original color tile deterrent 18 includes nine different colors (red (R), grey (E), black (K), orange (O), blue (B), yellow (Y), magenta (M), green (G) and cyan (C)), each of which is represented once in a row, once in a column, and once in each of the nine cells.

FIG. 3A is a pattern 24/subset S of the color tile deterrent 18. The pattern 24/subset S includes some deterrent data 22 from the original color tile deterrent 18. Generally, the pattern 24/subset S includes enough data 22 such that the print provider 14 (who is privy to the pattern 24/subset S) is able to solve the predetermined structure of the original deterrent 18. As described hereinabove, the pattern 24/subset S is used by the print provider 14 to glean the remaining deterrent data 22' (see FIG. 3C) to be infilled in the glyphs 20' of the color tile structure.

FIG. 3B is a non-limiting example of how the portion P of data 22 from the pattern 24/subset S may be transmitted via the connection 16. In this non-limiting example, the colors (E, G, G, K, C, R, Y, B, E, G, E, R, C, E, Y, K, R, B, M, Y, E, K, C, B, O, O, M) are transmitted as tiles in a 3×9 grid. As previously described, this data 22 may be transmitted in any format that is non-indicative of the pattern 24/subset S. As a non-limiting example, the 27 colors may be in any random order in the grid. It is believed that data 22 transmitted in such a format is generally useless to a would-be counterfeiter.

FIG. 3C illustrates an embodiment of the original color tile deterrent 18 after the print provider 14 has solved the predetermined structure. The gleaned data 22' (shown bolded) is the deterrent information/data that is not transmitted via connection 16, but rather is the data 22' solved algorithmically using the pattern 24/subset S and the portion P of data 22 transmitted.

FIG. 3D illustrates the gleaned data 22' with the transmitted data 22 removed from the grid or predetermined structure. As depicted, the glyphs 20' of the pattern 24/subset S (shown in FIG. 3A) are infilled with the gleaned data 22' in this figure. This data 22' is then implemented into a desirable security deterrent member 26 (see FIG. 3E). In this non-limiting example, the security deterrent member 26 is a color tile having a concentric black/white rectangle pattern embedded therein. The gleaned data 22' is shown in bold font in both FIGS. 3D and 3E such that the implementation of the data 22' from the deterrent 18 into the deterrent member 26 is clearly illustrated.

Embodiments of the method and system disclosed herein include, but are not limited to the following advantages. Without being bound to any theory, it is believed that the methods and system 10 advantageously provide enhanced error detection (by row, column, and cell simultaneously) and encryption (by sending a portion P, P' of deterrent data 22 and relying on the end device/entity 14 to compute the overall deterrent 18). Furthermore, error code checking may be innately performed in the encoding. This may be due, at least in part to the fact that certain predetermined structures (e.g., a 3×3 cell Sudoku) correspond to a roughly 4:1 redundancy. Furthermore, the deterrent provider 12 and the print provider 14 may, if desired, use an unsecured connection for transmitting a portion of deterrent data 22, substantially without compromising the overall security.

While several embodiments have been described in detail, it will be apparent to those skilled in the art that the disclosed embodiments may be modified. Therefore, the foregoing description is to be considered exemplary rather than limiting.

What is claimed is:

1. A method for securely transmitting deterrent data, comprising:
executing, on a first machine programmed to operate computer readable code, the steps of:
generating, a deterrent having a predesigned number and configuration of glyphs having deterrent data therein, the glyphs forming a predetermined two-dimensional structure with a single solution selected from a specific number of solutions for the predetermined two-dimensional structure;
generating a pattern to be used to determine the single solution, the pattern corresponding with the predetermined two-dimensional structure but having a subset of the glyphs having deterrent data therein and other glyphs not having deterrent data therein, wherein the deterrent data in the subset specifies the single solution;
transmitting, via a secure connection, the pattern to a second machine; and
transmitting the deterrent data from the subset of the glyphs of the pattern without transmitting deterrent data from a remainder of the glyphs in the deterrent, wherein the transmitted deterrent data is not indicative of a location of the deterrent data within the pattern; and
executing, on the second machine programmed to operate computer readable code and privy to the pattern, the steps of:
receiving the transmitted deterrent data;

inputting the received deterrent data into the predetermined two-dimensional structure according to the pattern; and then solving the single solution of the predetermined two-dimensional structure via a completion algorithm, thereby determining the deterrent data of the remainder of the glyphs to be infilled in the predetermined two-dimensional structure with deterrent data gleaned from the single solution.

2. The method as defined in claim 1, further comprising operatively deploying the gleaned deterrent data in a security deterrent member.

3. The method as defined in claim 2 wherein operatively deploying is accomplished by printing, via a printer, the security deterrent member having the gleaned deterrent data therein on an object.

4. The method as defined in claim 2 wherein the security deterrent member is selected from color bars, color tiles, guilloche patterns, concentric black/white rectangle patterns, 2-dimensional barcodes, modulation transfer function (MTF) patterns, tile patterns, color lines, fingerprint patterns, color text, copy detection patterns (CDP), letter sequences, number sequences, graphic sequences, target patterns, watermarks, or combinations thereof.

5. The method as defined in claim 1 wherein the predetermined two-dimensional structure is at least one of a Sudoku, a latin square, or a magic square.

6. The method as defined in claim 1 wherein the predetermined two-dimensional structure is a color tile structure.

7. The method as defined in claim 1 wherein the deterrent data from the subset of the glyphs of the pattern is transmitted using an unsecured transmitting means.

8. The method as defined in claim 1 wherein the first machine is associated with a deterrent provider, and wherein the second machine is associated with a print provider.

9. A system for securely transmitting deterrent data, comprising:

a deterrent having a predesigned number and configuration of glyphs having deterrent data therein, the glyphs forming a predetermined two-dimensional structure with a single solution selected from a specific number of solutions for the predetermined two-dimensional structure;

a deterrent provider including a first machine executing a program to:

generate the deterrent; and generate a pattern to be used to determine the single solution, the pattern corresponding with the predetermined two-dimensional structure but having a subset of the glyphs having deterrent data therein and other glyphs not having deterrent data therein, wherein the deterrent data in the subset specifies the single solution;

a secure connection for transmitting the pattern;

an unsecure connection for transmitting the deterrent data from the subset of the glyphs of the pattern without transmitting deterrent data from a remainder of the glyphs in the deterrent, wherein the transmitted deterrent data is not indicative of a location of the deterrent data within the pattern; and a print provider including a second machine executing a program to:

receive the transmitted deterrent data;

input the received deterrent data into the predetermined two-dimensional structure according to the pattern; and then solve the single solution of the predetermined two-dimensional structure via a completion algorithm, thereby determining the deterrent data of the remainder of the glyphs to be infilled in the predetermined two-dimensional structure with deterrent data gleaned from the single solution.

10. The system as defined in claim 9, further comprising a system for operatively deploying the gleaned deterrent data in a security deterrent member, wherein the system includes:

the second machine further executing the program for generating the security deterrent member having the gleaned deterrent data therein; and a printer for printing the security deterrent member having the gleaned deterrent data therein on an object.

11. The system as defined in claim 10 wherein the security deterrent member is selected from color bars, color tiles, guilloche patterns, concentric black/white rectangle patterns, 2-dimensional barcodes, modulation transfer function (MTF) patterns, tile patterns, color lines, fingerprint patterns, color text, copy detection patterns (CDP), letter sequences, number sequences, graphic sequences, target patterns, watermarks, or combinations thereof.

12. The system as defined in claim 9 wherein the predetermined two-dimensional structure is at least one of a Sudoku, a latin square, or a magic square.

13. The system as defined in claim 9 wherein the predetermined two-dimensional structure is a color tile structure.

* * * * *

UNITED STATES PATENT AND TRADEMARK OFFICE
CERTIFICATE OF CORRECTION

PATENT NO. : 9,195,837 B2  
APPLICATION NO. : 11/948632  
DATED : November 24, 2015  
INVENTOR(S) : Steven J. Simske Page 1 of 1

It is certified that error appears in the above-identified patent and that said Letters Patent is hereby corrected as shown below:

Claims

In column 6, line 43, in Claim 1, delete "generating," and insert -- generating --, therefor.

Signed and Sealed this  
Seventh Day of June, 2016

Michelle K. Lee  
*Director of the United States Patent and Trademark Office*